US012802080B2

(12) United States Patent
Dixit

(10) Patent No.: US 12,802,080 B2
(45) **Date of Patent: *Nov. 17, 2026**

(54) SYSTEMS AND METHODS FOR PARTIAL AUTHORIZATION OF ELECTRONIC TRANSACTIONS

(71) Applicant: Worldpay, LLC, Symmes Township, OH (US)

(72) Inventor: Sunil Dixit, Newton, MA (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,224

(22) Filed: May 31, 2023

(65) Prior Publication Data

US 2023/0306435 A1 Sep. 28, 2023

Related U.S. Application Data

(63) Continuation of application No. 17/328,300, filed on May 24, 2021, now Pat. No. 11,704,676, which is a continuation of application No. 16/730,504, filed on Dec. 30, 2019, now Pat. No. 11,049,113, which is a continuation of application No. 15/380,486, filed on Dec. 15, 2016, now Pat. No. 10,552,841.

(51) Int. Cl.
*G06Q 20/40* (2012.01)

(52) U.S. Cl.
CPC ....... *G06Q 20/4093* (2013.01); *G06Q 20/403* (2013.01); *G06Q 20/405* (2013.01)

(58) Field of Classification Search
None
See application file for complete search history.

(56) References Cited

U.S. PATENT DOCUMENTS

| | | | | |
|---|---|---|---|---|
| 8,636,203 | B1 | 1/2014 | Patterson et al. | |
| 2009/0024527 | A1 * | 1/2009 | Sellen .................... | G06Q 30/06 705/44 |
| 2014/0214653 | A1 | 7/2014 | Rose et al. | |
| 2016/0203484 | A1 | 7/2016 | Blinov et al. | |
| 2018/0039984 | A1 | 2/2018 | O'Neill et al. | |

* cited by examiner

*Primary Examiner* — Scott S Trotter
*Assistant Examiner* — Liz P Nguyen
(74) *Attorney, Agent, or Firm* — Bookoff McAndrews, PLLC

(57) ABSTRACT

A method for managing recurring payment submissions includes receiving, at an acquirer computing system, an authorization request submitted by a merchant computing system for a transaction, the transaction being one of a series of recurring transactions of a predefined amount, the merchant computing system being associated with a merchant, and the authorization request identifying account information for an account that is associated with a payment card network and an issuer processor; and iteratively re-transmitting the authorization request for less than the predefined amount and greater than a configurable threshold value, until the authorization request is approved by the issuer processor or until the authorization request falls below the configurable threshold value.

20 Claims, 6 Drawing Sheets

SYSTEMS AND METHODS FOR PARTIAL AUTHORIZATION OF ELECTRONIC TRANSACTIONS

CROSS-REFERENCE TO RELATED APPLICATION(S)

This patent application is a continuation of and claims the benefit of priority to U.S. application Ser. No. 17/328,300, filed on May 24, 2021, which is a continuation of U.S. application Ser. No. 16/730,504, filed on Dec. 30, 2019, now U.S. Pat. No. 11,049,113, which is a continuation of U.S. application Ser. No. 15/380,486, filed on Dec. 15, 2016, now U.S. Pat. No. 10,552,841, the entireties of which are incorporated herein by reference.

TECHNICAL FIELD

The present disclosure relates generally to the field of electronic transaction processing and, more particularly, to electronic management of recurring payment transaction submitted over electronic networks.

BACKGROUND

Electronic transactions and networks are used for a great number of purchases and sales between merchants and credit cardholders. A normal card transaction may involve a number of parties, including an account holder who possesses a card, a merchant, an acquirer processor, an issuer processor, an issuer financial institution, and a card association network. Millions of such transactions occur daily at merchants using a variety of payment card types, such as credit cards, debit cards, prepaid cards, and so forth. The transactions may be either a one-time event for the purchase of a product or service, or may be part of a subscription agreement reached between merchants and credit cardholders. Transactions based on account information received from an account holder may be declined for a number of different reasons, such as non-sufficient funds, card expiration, expired account information, or a variety of other occurrences. Declined transactions may lead to a variety of undesirable outcomes for the merchant and the account holder.

SUMMARY

According to certain aspects of the present disclosure, systems and methods are disclosed for electronic requests of recurring payment transactions submitted over an electronic payments network.

In one embodiment, a computer-implemented method is disclosed for managing recurring payment transactions submitted over an electronic payments network. The method includes: receiving, at an acquirer computing system, an authorization request submitted by a merchant computing system for a transaction, wherein the transaction is one of a series of recurring transactions of a predefined amount, wherein the merchant computing system is associated with a merchant, wherein the authorization request identifies account information for an account that is associated with a payment card network and an issuer processor; receiving, at the acquirer computing system, a configurable threshold value from the merchant for approving transactions that are below the predefined amount; transmitting, by the acquirer computing system, the authorization request to the issue processor for approving the transaction for the predefined amount, wherein if the issue processor declines the transaction for insufficient funds, re-transmitting the authorization request to the issue processor for less than the predefined amount but greater than the configurable threshold value, wherein re-transmitting the authorization request comprises an iterative reduction in the authorization request to the issue processor until an approval is received by the issue processor or until the authorization request falls below the configurable threshold value.

In accordance with another embodiment, a system is disclosed for managing recurring payment transaction requests. The system comprises: a memory having processor-readable instructions stored therein; and a processor configured to access the memory and execute the processor-readable instructions, which when executed by the processor configures the processor to perform a plurality of functions, including functions to: receive, at an acquirer computing system, an authorization request submitted by a merchant computing system for a transaction, wherein the transaction is one of a series of recurring transactions of a predefined amount, wherein the merchant computing system is associated with a merchant, wherein the authorization request identifies account information for an account that is associated with a payment card network and an issuer processor; receive, at the acquirer computing system, a configurable threshold value from the merchant for approving transactions that are below the predefined amount; transmit, by the acquirer computing system, the authorization request to the issue processor for approving the transaction for the predefined amount, wherein if the issue processor declines the transaction for insufficient funds, re-transmits the authorization request to the issue processor for less than the predefined amount but greater than the configurable threshold value, wherein re-transmitting the authorization request comprises an iterative reduction in the authorization request to the issue processor until an approval is received by the issue processor or until the authorization request falls below the configurable threshold value.

In accordance with another embodiment, a non-transitory machine-readable medium is disclosed that stores instructions that, when executed by a computer, cause the computer to perform a method for scheduling payment transaction requests. The method includes: receiving, at an acquirer computing system, an authorization request submitted by a merchant computing system for a transaction, wherein the transaction is one of a series of recurring transactions of a predefined amount, wherein the merchant computing system is associated with a merchant, wherein the authorization request identifies account information for an account that is associated with a payment card network and an issuer processor; receiving, at the acquirer computing system, a configurable threshold value from the merchant for approving transactions that are below the predefined amount; transmitting, by the acquirer computing system, the authorization request to the issue processor for approving the transaction for the predefined amount, wherein if the issue processor declines the transaction for insufficient funds, re-transmitting the authorization request to the issue processor for less than the predefined amount but greater than the configurable threshold value, wherein re-transmitting the authorization request comprises an iterative reduction in the authorization request to the issue processor until an approval is received by the issue processor or until the authorization request falls below the configurable threshold value.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1:
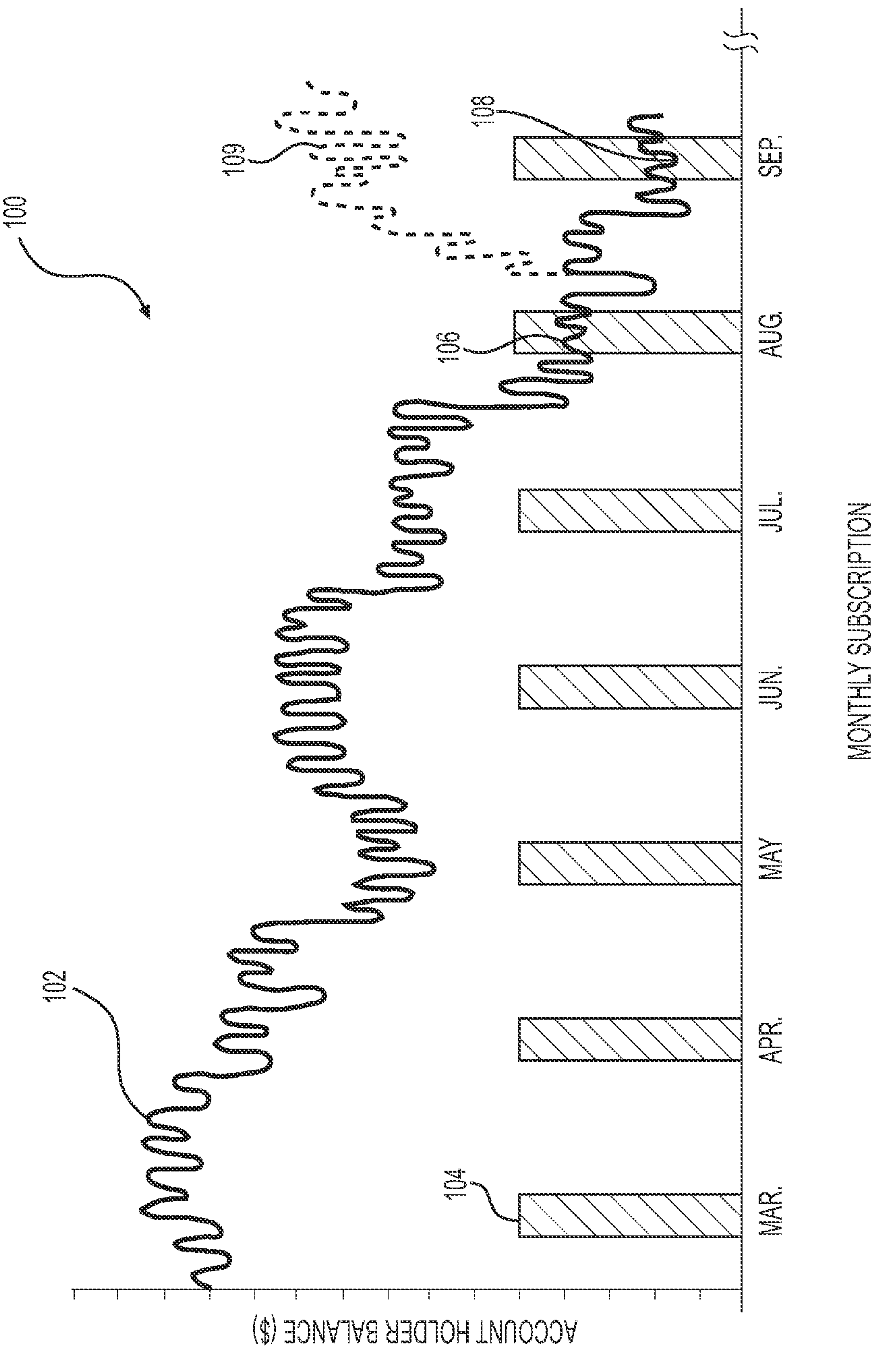
FIG. 1 depicts a graphical representation of an account holder's balance fluctuating over a series of months, according to one or more embodiments.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for the management of recurring payment transactions as part of a subscription agreement.

For simplicity, the description that follows will be provided by reference to a "payment vehicle," which generally refers to any type of financial alternative to currency. As is to be clear to those skilled in the art, no aspect of the present disclosure is limited to a specific type of payment vehicle. Therefore, it is intended that the following description encompasses the use of the present disclosed techniques with many other forms of financial alternatives to currency, including credit cards, debit cards, smart cards, single-use cards, pre-paid cards, electronic currency (such as might be provided through a cellular telephone or personal digital assistant), and the like. Payment vehicles may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle may also have electronic functionality provided by a network of electronic circuitry that is printed or otherwise incorporated onto or within the payment vehicle (and typically referred to as a "smart card"), or be a fob having a transponder and an RFID reader, or may operate as a mobile wallet or by near field communication (NFC).

As described above, declined transaction payment requests may lead to undesirable outcomes, and associated increased costs, for merchants and account holders. Thus, the embodiments of the present disclosure are directed to improving (i.e., increasing) the successful authorization of transaction payment requests. Furthermore, embodiments of the present disclosure provide for automatic scheduling of transaction payment requests based on an iterative reduction in payment amount in order to increase the likelihood of successful authorization of the transaction payment requests.

Some merchants have a need to utilize recurring transactions to periodically collect funds from a consumer. Examples include health club memberships, insurance premiums, subscription fees, and so forth. For convenience, the merchant may accept payment for an initial transaction using a payment vehicle that is received from the consumer. At a later point in time, and sometimes based on a particular payment schedule, the merchant may utilize account information received during the initial transaction to initiate a second transaction. These recurring billing arrangements may be used, for example, when a consumer agrees to pay a regular monthly, quarterly, or annual fee for a product, service, or membership. In some cases, the dollar amount of each charge may vary depending on the product or service. Because of supporting recurring transactions, merchants realize several benefits, such as timely payments, reduced processing time/cost, and lower risk of error due to manual entry.

Recurring billing may also be used to in the context of installment billing plans, which allow a consumer to purchase a product in a defined number of installments, typically of equal value. Examples include direct response television (DRTV) products and many catalog products. By offering installment billing, merchants may achieve increased sales of higher ticket items, timely payments, and lower risk of chargebacks.

Such recurring transactions may result in declined authorizations if a card account holder's balance is less than what is needed to cover the installment billing. Declined transactions may lead to a variety of undesirable outcomes for the merchant and the account holder. Because a major expense for subscription merchants is the cost of customer acquisition, declined transactions result in lost revenue and potential costs in customer reacquisition. For customers, a declined transaction may have been due to unforeseen expenses that unexpectedly cause their account balance to fall short of a recurring installment. It would therefore benefit a subscription merchant to authorize transactions for less than the expected installment payment to maximize revenue and keep customers on an ongoing installment plan. In accordance with one or more embodiments of the present disclosure, an acquirer processor associated with the merchant may receive a configurable threshold value for approving transactions for less than the expected installment payment. In such embodiments, the acquirer processor may iteratively request authorization for partial payments until an approval is received or until the request authorization falls below the configurable threshold value.

One or more examples of these non-limiting embodiments are illustrated in the selected examples disclosed and described in detail with reference to FIGS. 1-6 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 is an exemplary representation of an account holder on an installment plan with an account balance that fluctuates over a series of months. A consumer may use any number of payment vehicles to enter into a subscription agreement for the purchase of products or services. Merchants may then apply a recurring installment 104 against the card holder's account in exchange for the products or services. Account holder balance 102 reflects the available funds in the card holder's account and is shown to fluctuate over the series of months as deposits or charges are made against the account.

Unforeseen expenses may cause a consumer's account balance 102 to fall below a recurring installment 104, potentially resulting in a declined authorization and lost revenue for the merchant. If the account holder's balance 102 falls below a value of recurring installment 104, it would benefit the merchant to instead approve the transaction for a partial amount rather than foregoing the entire value of the recurring installment 104. In some embodiments, the authorization for the partial amount can be characterized as a discount to the consumer and an extension of goodwill by the merchant.

In accordance with one or more embodiments of the present disclosure, an acquirer processor may receive a configurable threshold value from a merchant for approving transactions that fall below the recurring installment 104. In some embodiments, the configurable threshold value may be a portion (e.g., percentage) of the recurring installment value that the merchant is willing to accept as partial payment. As an example, authorization request 106 may reflect an approved transaction for a partial amount because the partial authorization value may be higher than a configurable threshold value set by the merchant. Authorization request 108 may instead reflect a declined transaction for a partial amount because the partial authorization value may be lower than the configurable threshold value set by the merchant. Alternatively, with the rise of an account holder's balance 102, authorization request 109 may reflect an approved transaction and a continuation of the subscription at the usual amount.

Figure 2:
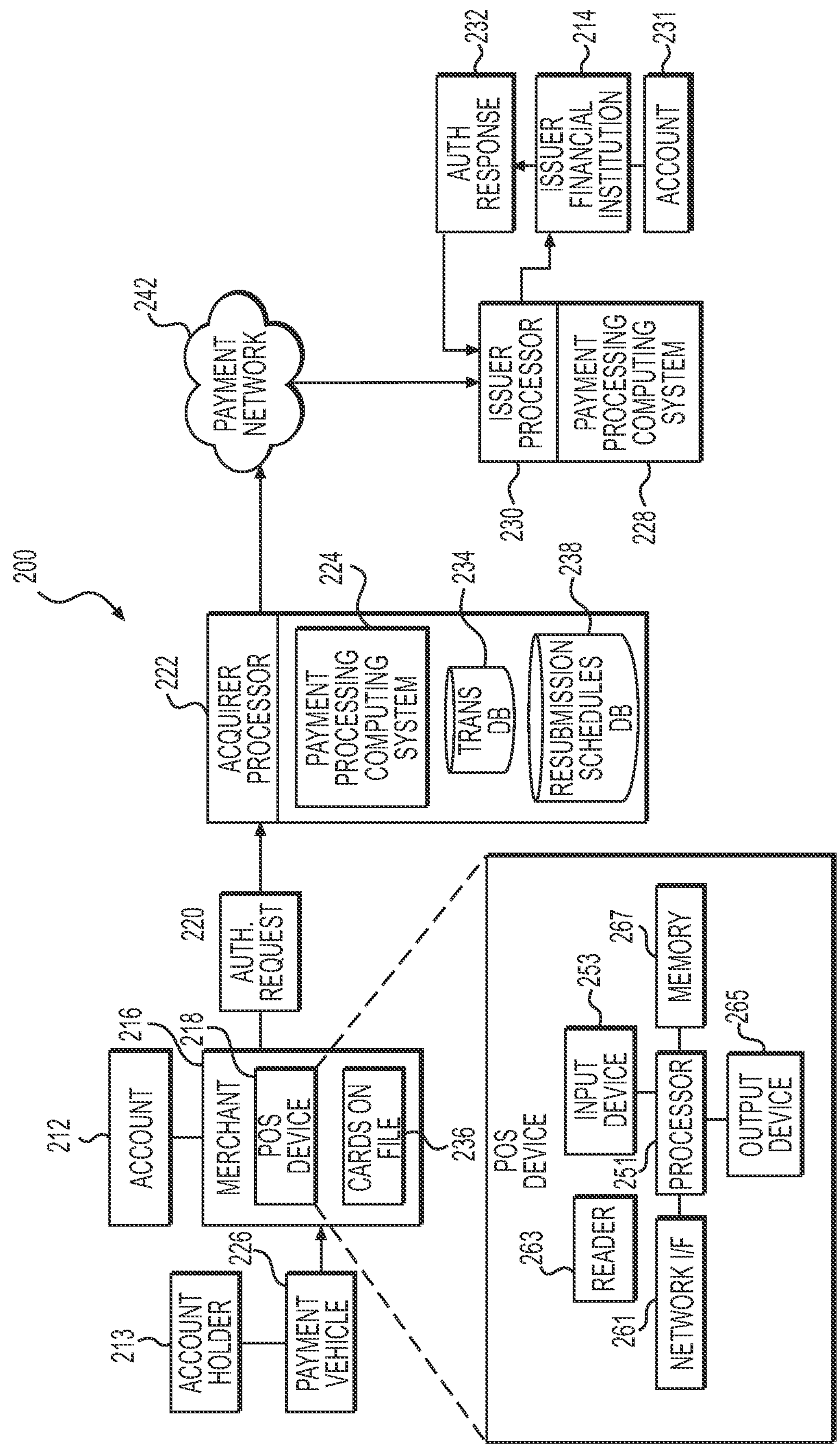
FIG. 2 depicts a block diagram of an example payment system and network in which electronic payment submission scheduling is performed, according to one or more embodiments.

FIG. 2 depicts a block diagram of an example payment environment 200 for performing electronic requests of recurring payment transactions over an electronic network. In the example payment environment 200, a payment vehicle 226 (e.g., a credit card) may be issued to an account holder 213 by an issuer financial institution 214. Issuer financial institution 214 may be any of a variety of financial institutions that is capable of issuing a payment vehicle to an account holder. Payment vehicle 226 may be used to pay a merchant 216 for a purchase transaction at a merchant point of sale (POS) device 218. Merchant POS device 218 may be any device that facilitates receipt of a payment vehicle for payment of a purchase, such as for example, a POS terminal or a web interface. Further, merchant 216 may be any type of merchant or service provider, such as, for example, a brick-and-mortar merchant, an online merchant, a mobile merchant, a kiosk, or any other type of merchant or device configured to receive payment cards, or electronic or mobile wallets, from account holders as a form of payment.

POS device 218 may be configured to interact with payment vehicle 226 to obtain account information about a consumer account affiliated with account holder 213. As shown in the depicted callout of POS device 218, in one or more embodiments, POS device 218 may include a memory 267 coupled to processor 251, which may control the operations of a reader 263, an input device 253, an output device 265, and a network interface 261. Memory 267 may store instructions for processor 251 and/or data, such as, for example, an identifier that is associated with merchant account 212.

In one or more embodiments, reader 263 may include a magnetic strip reader. In one or more embodiments, reader 263 may include a contactless reader, such as, for example, a radio frequency identification (RFID) reader, a near field communications (NFC) device configured to read data via magnetic field coupling (in accordance with ISO standard 14443/NFC), a Bluetooth transceiver, a Wi-Fi transceiver, an infrared transceiver, a laser scanner, and so forth.

In one or more embodiments, input device 253 may include key buttons that may be used to enter the account information directly into POS device 218 without the physical presence of payment vehicle 226. Input device 253 may be configured to provide further information to initiate a transaction, such as, for example, a personal identification number (PIN), password, zip code, etc., or in combination with the account information obtained from payment vehicle 226. In one or more embodiments, output device 265 may include a display, a speaker, and/or a printer to present information, such as, for example, the result of an authorization request, a receipt for the transaction, an advertisement, and so forth.

In one or more embodiments, network interface 261 may be configured to communicate with acquirer processor 222 such as, for example, via a telephone connection, an Internet connection, or a dedicated data communication channel.

In one or more embodiments, the instructions stored in memory 267 may be configured at least to cause POS device 218 to send an authorization request message to acquirer processor 222 to initiate a transaction. POS device 218 may or may not send a separate request for the clearing and settling of the transaction. The instructions stored in memory 267 also may be configured to cause POS device 218 to perform other types of functions discussed in this description.

In one or more embodiments, POS device 218 may have fewer components than those illustrated in FIG. 2. For example, in one or more embodiments, POS device 218 may be configured for "card-not-present" transactions; and POS device 218 may not have a reader 263. In one or more embodiments, POS device 218 may have more components than those illustrated in FIG. 2.

During a purchase event, merchant POS device 218 may send an authorization request 220 for the purchase transaction to acquirer processor 222 that processes payment vehicle transactions for merchant 216. Additional intermediary entities, such as one or more payment gateways, may assist with the handling and routing of authorization request 220 or other related messaging. For the purposes of illustration, such intermediary entities may be considered part of acquirer processor 222. Authorization request 220 may include identifying information from payment vehicle 226, such as a BIN number, an expiration date, and a first and last name of the account holder, for example. Authorization request 220 may further include identifying information from the purchase, such as an amount and identifying information from merchant POS device 218 and/or merchant 216, for example.

In one or more embodiments, payment vehicle 226 may be used to establish a recurring billing arrangement between account holder 213 and merchant 216. An initial transaction may allow merchant 216 to store account information that may be used for subsequent billing events. The account information may be stored in a cards-on-file storage 236. For example, the purchase event illustrated in FIG. 2 may be associated with a subscription, membership plan, installment payment plan between merchant 216 and account holder 213, and so on. For subsequent transactions, merchant 216 may access cards-on-file storage 236 to retrieve the relevant account information. The subsequent transactions may not require direct involvement from account holder 213. In one or more embodiments, account holder 213 may trigger the subsequent transaction, but may not provide payment vehicle 226 to merchant 216, as merchant 216 may access the cardholder's account information in cards-on-file storage 236.

A payment processing computing system 224 at acquirer processor 222 may receive authorization request 220 from merchant 216. Payment processing computing system 224 may translate authorization request 220, if necessary, and may provide authorization request 220 to a payment network 242. Payment network 242 may be, for example, a network of a credit card association affiliated with payment vehicle 226. Nonlimiting examples of credit card associations include VISA, MASTERCARD, DISCOVER, and AMERICAN EXPRESS, and so on. Authorization request 220 then may be provided to a payment processing computing system 228 at an issuer processor 230. In response to receiving the authorization request, and based on the type of payment vehicle 226, payment processing computing system 228 may provide authorization request 220 to issuer financial institution 214. Using information from authorization request 220, issuer financial institution 214 may associate the purchase transaction with an account 231 of account holder 213 held by issuer financial institution 214. Issuer financial institution 214 then may send an authorization response 232 which may either approve or deny the transaction. Authorization response 232 may be provided to payment processing computing system 228 at issuer processor 230 and then provided to payment network 242. Authorization response 232 then may be provided to payment processing computing system 224 at acquirer processor 222. Upon receiving authorization response 232, payment processing computing system 224 may send either an approval message or a denial message to merchant POS device 218 to complete the purchase transaction. If the purchase transaction is approved, it may be posted to account holder's account 231 and reconciled later with account holder 213 and merchant 216.

Transaction records may be stored in one or more locations within system 200. In one or more embodiments, the transaction record may be stored within a transaction data database 234 of acquirer processor 222. The transaction data may be received by transaction data database 234 from various sources, such as merchant POS device 218, merchant 216, acquirer processor 222, and so on. A plurality of transaction parameters associated with the purchase transaction may be stored in each transaction record, which may generally be used for settlement and financial recordkeeping. While the transaction parameters stored in each transaction record may vary, example transaction parameters may include, without limitation, account number, card number, payment vehicle information, product information (such as product type, product serial number, and so forth), transaction amount, loyalty account information, merchant information, transaction amount, response code, transaction date, transaction time, whether the transaction was a "card present" transaction, and so on.

Figure 3:
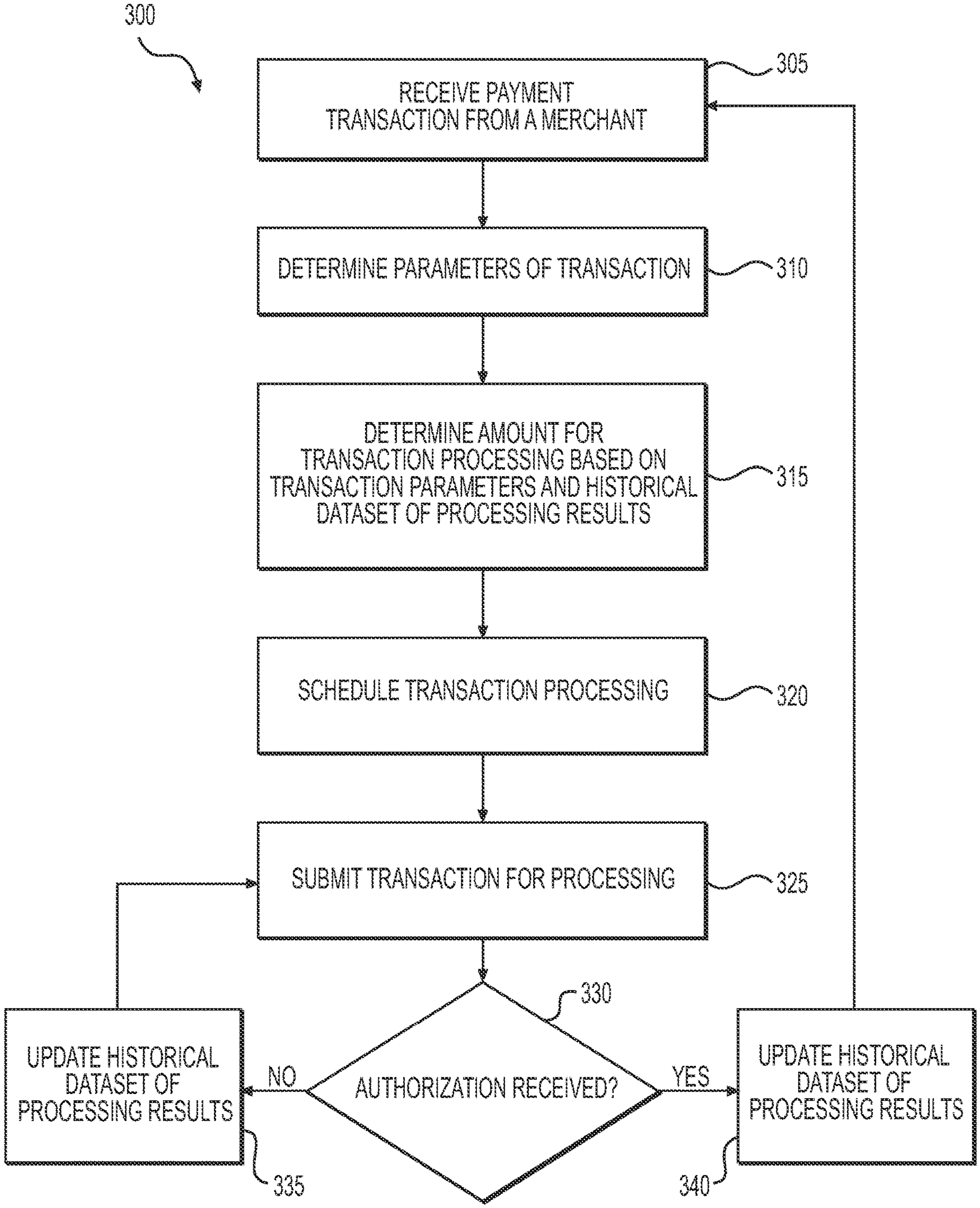
FIG. 3 is a flow chart depicting an example process for electronic payment submission scheduling, according to one or more embodiments.

FIG. 3 is a flow chart depicting a method 300 for payment submission scheduling, according to one or more embodiments. As shown in FIG. 3, operation 305 may include receiving a payment transaction from a merchant. For example, acquirer processor 222, depicted in FIG. 2 may receive authorization request 220 from merchant 216. Operation 310 may include determining parameters of the received payment transaction. For example, the payment transactions may include the expected value of the recurring installment payments. In other embodiments, the determining parameters may include the configurable threshold value (e.g., an absolute dollar value or a percentage of the expected value) set by the merchant for approving partial authorizations. Operation 315 may include determining an optimal amount for submitting the payment transaction based on the determined payment transaction parameters and a historical dataset of processing results. For example, the optimal amount may be a percentage of the monthly installment payment. In other embodiments, the optimal amount may be determined by requesting authorization close to the full amount and iteratively requesting authorization for a reduced amount until an approval is received (e.g., 99% of the expected amount, 98% of the expected amount, 97% of the expected amount, and so on). By iteratively requesting authorization for a reduced amount, the merchant may be able to maximize revenue and recover close to the original expected amount. Operation 320 may include scheduling the submission of the payment transaction according to whether an approval was received, or whether a new authorization request can be made if the amount is above the configurable threshold value set by the merchant. Operation 325 may include submitting the payment transaction for processing. If an authorization failure is received at operation 330 then the method may proceed to operation 335. Operation 335 may include updating the historical dataset of processing results and returning to operation 325 to possibly resubmit the payment transaction for further processing. If an authorization success is received at operation 330 then the method may proceed to operation 340. Operation 340 may include updating the historical dataset of processing results and returning to operation 305 to receive an additional payment transaction from a merchant.

Figure 4:
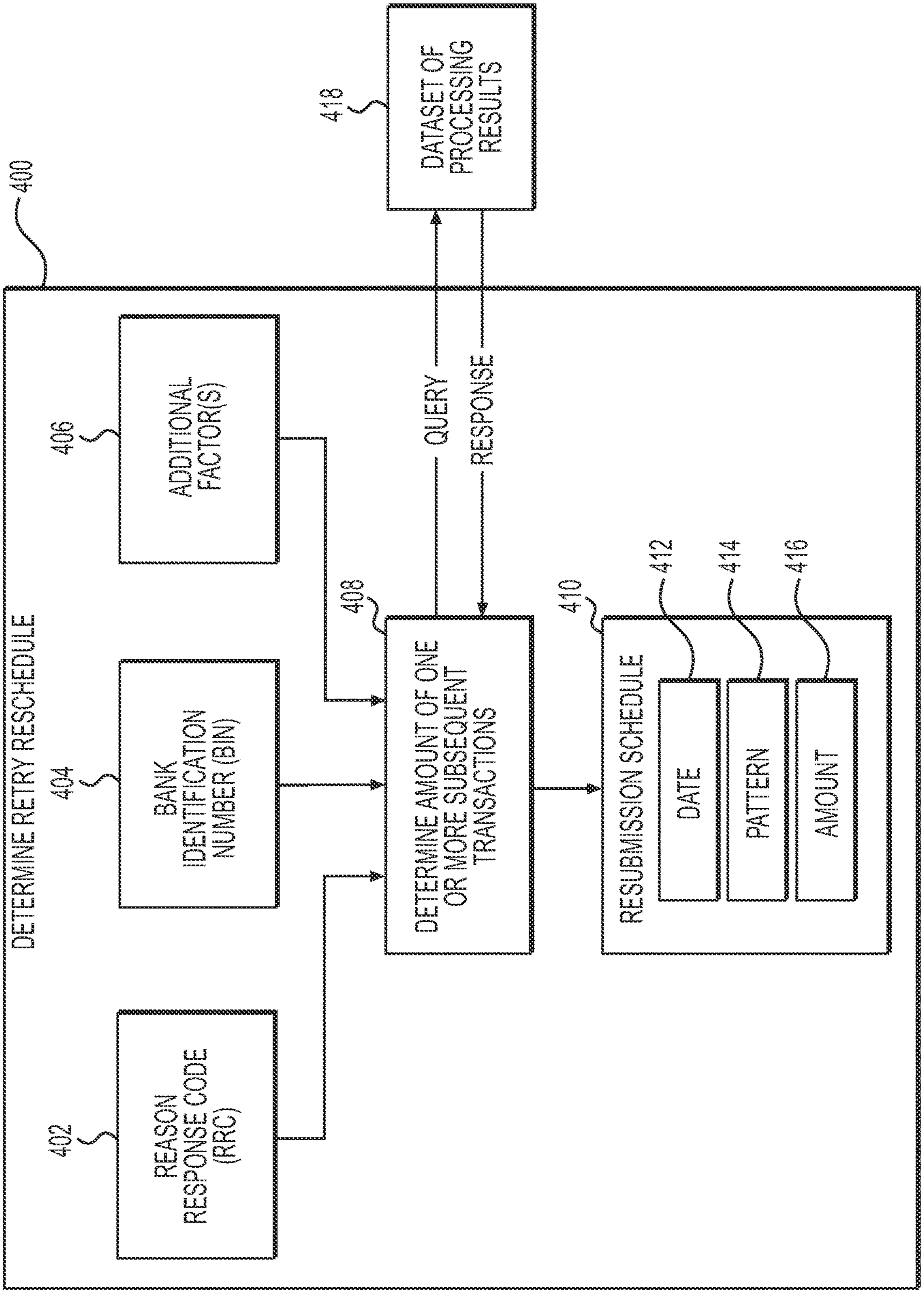
FIG. 4 depicts a block diagram of an example process logic flow and modules for electronic payment submission scheduling, according to one or more embodiments.

FIG. 4 depicts a block diagram of an example process flow for payment submission scheduling, according to one or more embodiments. The scheduling of a payment transaction submission may occur based on one or more factors including, for example, a Reason Response Code (RRC) 402 from a previous payment transaction, and a Bank Identification Number (BIN) 404. Additionally or alternatively, additional factors 406 may be used which can include, but are not limited to, fraud detection settings of issuer processor 230, Merchant Identification Number (MID), amount of transaction, payment vehicle type and/or account holder name, for example. In some embodiments, one or more of these factors may be used to determine a schedule for the submission of the payment transaction. The schedule may establish value amounts and one or more time windows within which the payment transaction may be submitted. A dataset of processing results 418 may be utilized in determining optimal value amounts as well as making the timing determination. According to one or more embodiments, dataset of processing results 418 may be gathered from transaction data database 234 as shown in FIG. 2. Dataset of processing results 418 may include historical transaction data that can be correlated to one of more of the factors. The determination of the partial authorization amounts and timing of one or more transactions may result in the production of a submission schedule 410. Submission schedule 410 may be built using any suitable rules, such as a date rule 412, a pattern rule 414, or an amount rule 416. Date rule 412 can indicate, for example, a date of the month, a day of the week, or a number of days in the future to initiate subsequent transactions. Pattern rule 414 can indicate the pattern of percentage values by which to decrement and request partial authorizations. Amount rule 416 may indicate monetary unit values by which to decrement and request partial authorizations. Submission schedule 410 may be stored in submission schedules database 238.

Figure 5:
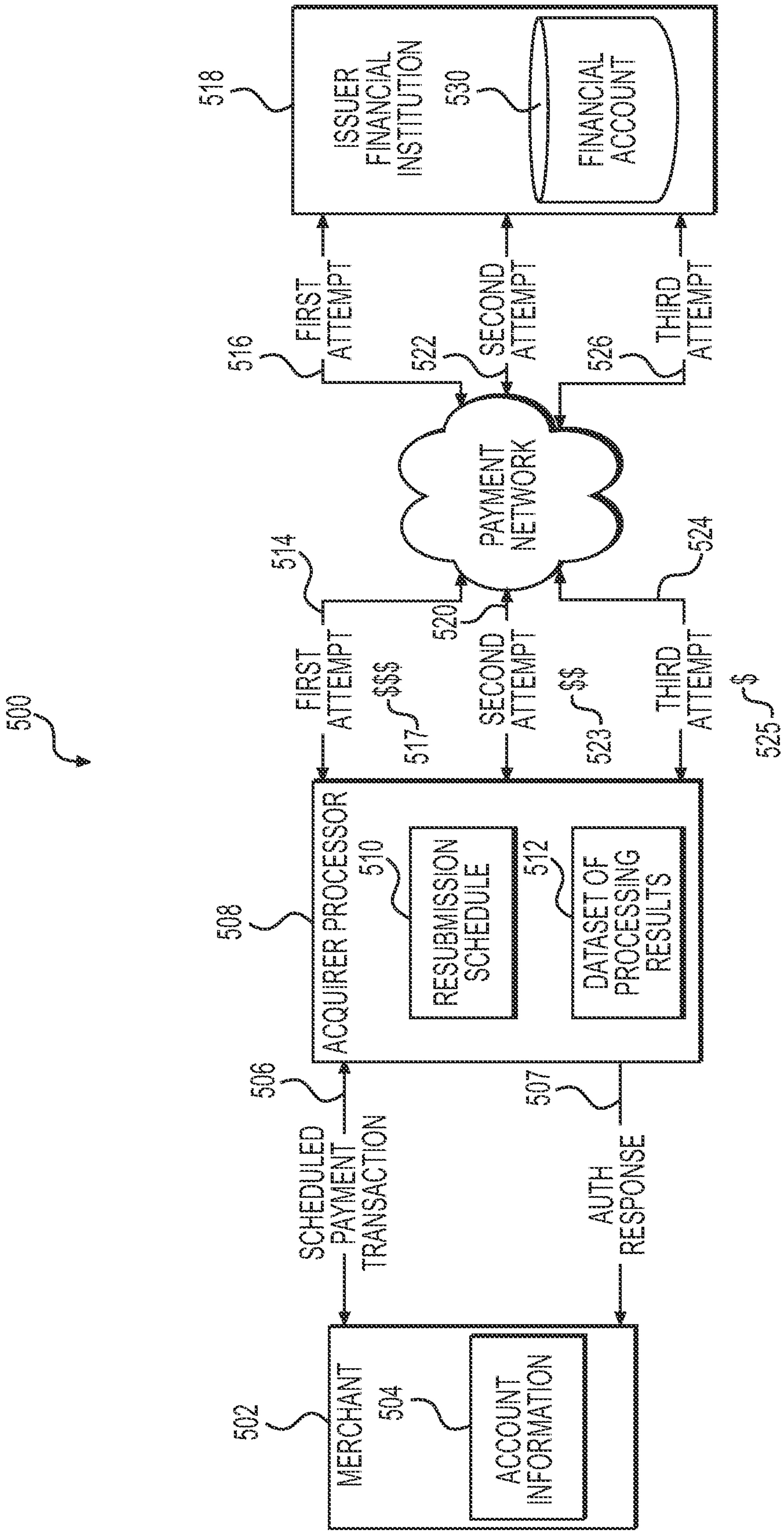
FIG. 5 depicts a block diagram of an example system and process flow for electronic payment submission scheduling, according to one or more embodiments.

FIG. 5 depicts a block diagram of an example process flow for payment submission scheduling, according to one or more embodiments. A scheduled payment transaction 506 is received from a merchant 502 by an acquirer processor 508. Scheduled payment transaction 506 may be based on account information 504 maintained by merchant 502, or elsewhere, as may be appropriate. Scheduled payment transaction 506 may include typical transaction data, such as, for example, an amount, an account identifier, a BIN, a merchant identifier, etc. At least some of the transaction data transmitted in the scheduled payment transaction may include data that was originally received by merchant 502 during an initial payment transaction originating with a payment vehicle and stored in cards-on-file storage 136, for example. A payment processing computing system of acquirer processor 508 may determine the card association that is affiliated with the scheduled payment transaction 506 (e.g., VISA, MASTERCARD, and so forth), to determine the proper processing channels for the transaction.

Acquirer processor 508 may transmit an authorization attempt or transaction request 514 to a payment network, which in turn may transmit transaction request 516 to an issuer financial institution 518. Issuer financial institution 518 may approve or reject the authorization request based on a status of a financial account 530 associated with the transaction or cardholder, or other factors, such as, for example, a transaction processing volume of financial institution 518. Acquirer processor 508 may communicate the authorization result of transaction request 516 to merchant 502 by, for example, an authorization response 507. Financial account 530 can be any suitable account, such as a DDA account, a gift card account, a prepaid account, or any other type of account that can be linked to or accessed by payment vehicle. The available account balance of financial account 530 may vary over time as the account holder withdraws funds and deposits funds. Transaction requests may be rejected, for example, for reasons associated with financial account 530, such as non-sufficient funds, out-of-date account information, etc. Acquirer processor 508 may store factors associated with transaction request 516 in dataset of processing results 512 to be used to determine a submission schedule 510 for subsequent transaction requests. As described above, factors associated with transaction request 516 may include, for example, BIN 422, RRC 434, and so forth. In accordance with one or more embodiments, submission schedule 510 may identify value amounts or a date and a time for a subsequent transaction attempt. For example, dollar amounts 517, 523, and 525, reflect repeated attempts for partial authorization according to reduced percentages or reduced monetary units until an approval is received. Acquirer processor 508 may then submit subsequent transaction requests according to submission schedule 510.

Figure 6:
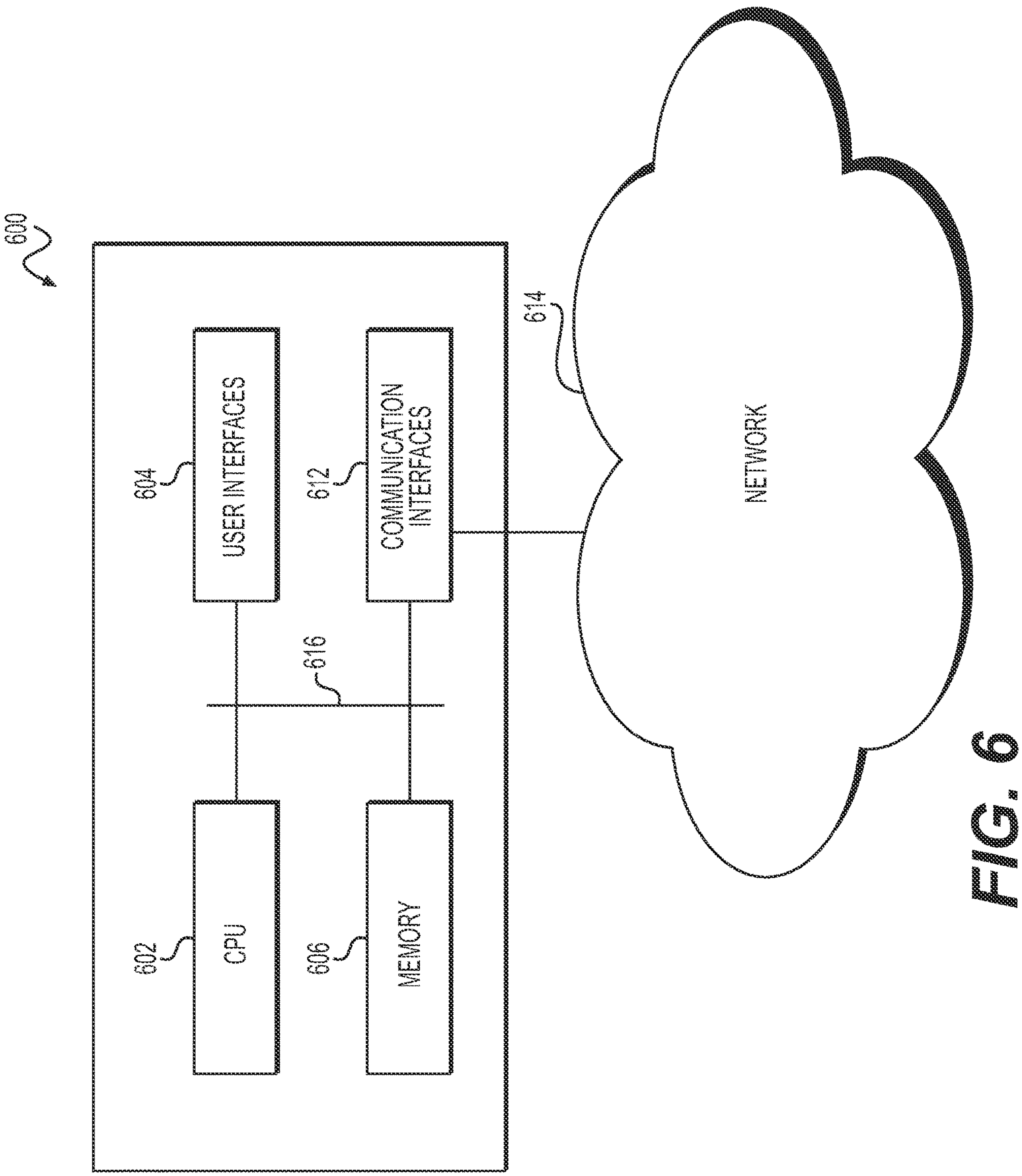
FIG. 6 depicts a computing device for electronic payment submission scheduling, according to one or more embodiments.

The processes described herein may be performed on or between one or more computing devices that are specially configured to perform the processing described herein. Referring now to FIG. 6, an example computing device 600 is presented. A computing device 600 may be, for example, a server, a computing device that is integrated with other systems or subsystems, a mobile computing device, a cloud-based computing capability, and so forth. The computing device 600 can be any suitable computing device as would be understood in the art, including without limitation, for example, a custom chip, an embedded processing device, a tablet computing device, a POS device 218, a payment processing computing system 224, a payment processing computing system 228, a personal data assistant (PDA), a desktop, a laptop, a microcomputer, a minicomputer, a server, a mainframe, or any other suitable programmable device. According to one or more embodiments, a single component can be replaced by multiple components and multiple components can be replaced by a single component to perform a given function or functions. Except where such substitution would not be operative, such substitution is within the intended scope of the one or more embodiments.

The computing device 600 may include a processor 602 that may be any suitable type of processing unit such as, for example, a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources may further include, for example, distributed computing devices, cloud computing resources, and virtual computing resources in general, etc.

The computing device 600 also may include one or more memories 606 such as, for example, read only memory (ROM), random access memory (RAM), cache memory associated with the processor 1002, or other memories such as dynamic RAM (DRAM), static ram (SRAM), programmable ROM (PROM), electrically erasable PROM (EEPROM), flash memory, a removable memory card or disk, a solid state drive, and so forth. The computing device 600 also may include storage media such as, for example, a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 602, or memories 606 are also contemplated as storage devices. It can be appreciated that such memory can be internal or external with respect to operation of the disclosed embodiments. It can be appreciated that certain portions of the processes described herein may be performed using instructions stored on a non-transitory computer-readable medium or media that direct a computer system to perform the process steps. Non-transitory computer-readable media, as used herein, comprises all computer-readable media except for transitory, propagating signals.

Network and communication interfaces 612 may be configured to transmit to, or receive data from, other computing devices 600 across a network 614. The network and communication interfaces 612 may be, for example, an Ethernet interface, a radio interface, a Universal Serial Bus (USB) interface, or any other suitable communications interface and can include receivers, transmitter, and transceivers. For purposes of clarity, a transceiver may be referred to as a receiver or a transmitter when referring to only the input or only the output functionality of the transceiver. Example communication interfaces 612 may include, for example, wired data transmission links such as Ethernet and TCP/IP. The communication interfaces 612 may include, for example, wireless protocols for interfacing with private or public networks 614. For example, the network and communication interfaces 612 and protocols may include interfaces for communicating with private wireless networks such as, for example, a Wi-Fi network, one of the IEEE 802.11x family of networks, or another suitable wireless network. The network and communication interfaces 612 may include interfaces and protocols for communicating with public wireless networks 612, using, for example, wireless protocols used by cellular network providers, including Code Division Multiple Access (CDMA) and Global System for Mobile Communications (GSM), etc. A computing device 600 may use network and communication interfaces 612 to communicate with hardware modules such as, for example, a database or data store, or one or more servers or other networked computing resources. Data may be encrypted or protected from unauthorized access.

According to one or more embodiments, the computing device 600 may include a system bus 616 for interconnecting the various components of the computing device 600, or the computing device 600 may be integrated into one or more chips such as, for example, a programmable logic device or an application specific integrated circuit (ASIC), etc. The system bus 616 may include, for example, a memory controller, a local bus, or a peripheral bus for supporting input and output devices 604, and communication interfaces 612, etc. Example input and output devices 604 may include keyboards, keypads, gesture or graphical input devices, motion input devices, touchscreen interfaces, one or more displays, audio units, voice recognition units, vibratory devices, computer mice, and any other suitable user interface.

The processor 602 and memory 606 may include nonvolatile memory for storing, for example, computer-readable instructions, data, data structures, program modules, code, microcode, and other software components for storing the computer-readable instructions in non-transitory computer-readable mediums in connection with the other hardware components for carrying out the methodologies described herein. Software components may include, for example, source code, compiled code, interpreted code, executable code, static code, dynamic code, encrypted code, or any other suitable type of code or computer instructions implemented using any suitable methodology including, for example, high-level, low-level, object-oriented, visual, compiled, or interpreted programming language, etc.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms “information” and “data” are used expansively and includes a wide variety of electronic information, including executable code; content such as text, video data, and audio data, among others; and various codes or flags. The terms “information,” “data,” and “content” are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method for managing recurring authorization requests for payment transactions, the method comprising:

transmitting, by a payment processing computing system of an acquirer processor, an authorization request associated with a merchant system to an issuer processor for approving an electronic transaction for an initial transaction value, wherein the electronic transaction is originated with a payment vehicle at a point of sale (POS) device in electronic communication with the merchant system, and wherein the electronic transaction includes a plurality of transaction data;

receiving, by the payment processing computing system, an authorization response from the issuer processor;

in response to determining that the electronic transaction is declined for the initial transaction value based on the authorization response, determining, by the payment processing computing system, a re-submission schedule for re-transmitting the authorization request based on one or more factors associated with the authorization request, the one or more factors including a bank identification number (BIN) and a reason response code (RRC) associated with the authorization request; and iteratively re-processing the authorization request according to the re-submission schedule across a payment network in electronic communication with the payment processing computing system, the authorization request including at least a portion of the plurality of transaction data of the electronic transaction, wherein iteratively re-processing the authorization request comprises;

iteratively transmitting, by the payment processing computing system, the authorization request across the payment network to the issuer processor, each iterative transmission of the authorization request for an iterative reduced transaction value that is less than the initial transaction value and greater than a configurable threshold value unique to the merchant system in each iterative transmission of the authorization request until approval is received from the issuer processor by the payment processing computing system or until the iterative reduced transaction value of a re-processed authorization request falls below the configurable threshold value.

2. The method of claim 1, wherein the iterative reduced transaction value comprises a reduction by an incremental percentage of a predefined transaction value.

3. The method of claim 1, wherein the iterative reduced transaction value comprises a stepwise reduction by a unit value.

4. The method of claim 1, further comprising:

determining, by the payment processing computing system, the re-submission schedule based on a partial authorization of the electronic transaction and a timing of the electronic transaction.

5. The method of claim 1, further comprising:

receiving an authorization result from the issuer processor; and updating a dataset of historical processing results using the received authorization result.

6. The method of claim 1, further comprising:

transmitting, by the payment processing computing system to the POS device, indication of an approved authorization when the issuer processor approves the authorization request.

7. The method of claim 4, wherein determining the re-submission schedule comprises:

identifying, by the payment processing computing system, a rule set associated with the electronic transaction.

8. A non-transitory computer readable medium storing instructions which, when executed by at least one processor, cause the at least one processor to perform operations for managing recurring authorization requests for payment transactions, the operations comprising:

transmitting, by a payment processing computing system of an acquirer processor, an authorization request associated with a merchant system to an issuer processor for approving an electronic transaction for an initial transaction value, wherein the electronic transaction is originated with a payment vehicle at a point of sale (POS) device in electronic communication with the merchant system, and wherein the electronic transaction includes a plurality of transaction data;

receiving, by the payment processing computing system, an authorization response from the issuer processor:

in response to determining that the electronic transaction is declined for the initial transaction value based on the authorization response, determining, by the payment processing computing system, a re-submission schedule for re-transmitting the authorization request based on one or more factors associated with the authorization request, the one or more factors including a bank identification number (BIN) and a reason response code (RRC) associated with the authorization request; and iteratively re-processing the authorization request according to the re-submission schedule across a payment network in electronic communication with the payment processing computing system, the authorization request including at least a portion of the plurality of transaction data of the electronic transaction, wherein iteratively re-processing the authorization request comprises:

iteratively transmitting, by the payment processing computing system, the authorization request across the payment network to the issuer processor, each iterative transmission of the authorization request for an iterative reduced transaction value that is less than the initial transaction value and greater than a configurable threshold value unique to the merchant system in each iterative transmission of the authorization request until approval is received from the issuer processor by the payment processing computing system or until the iterative reduced transaction value of a re-processed authorization request falls below the configurable threshold value.

9. The non-transitory computer readable medium of claim 8, wherein the iterative reduced transaction value comprises a reduction by an incremental percentage of a predefined transaction value.

10. The non-transitory computer readable medium of claim 8, wherein the iterative reduced reduction of the transaction value comprises a stepwise reduction by a unit value.

11. The non-transitory computer readable medium of claim 8, the operations further comprising:

determining the re-submission schedule based on a partial authorization of the electronic transaction and a timing of the electronic transaction.

12. The non-transitory computer readable medium of claim 8, the operations further comprising:

receiving an authorization result from the issuer processor; and updating a dataset of historical processing results using the received authorization result.

13. The non-transitory computer readable medium of claim 8, the operations further comprising:

transmitting, to the POS device, indication of an approved authorization when the issuer processor approves the authorization request.

14. A payment processing computing system for managing recurring authorization requests for payment transactions, the payment processing computing system comprising a non-transitory computer readable medium having instructions stored thereon which, when executed by at least one processor, cause the at least one processor to perform operations comprising:

transmitting, by a payment processing computing system of an acquirer processor, an authorization request associated with a merchant system to an issuer processor for approving an electronic transaction for an initial transaction value, wherein the electronic transaction is originated with a payment vehicle at a point of sale (POS) device in electronic communication with the merchant system, and wherein the electronic transaction includes a plurality of transaction data;

receiving, by the payment processing computing system, an authorization response from the issuer processor;

in response to determining that the electronic transaction is declined for the initial transaction value based on the authorization response, determining, by the payment processing computing system, a re-submission schedule for re-transmitting the authorization request based on one or more factors associated with the authorization request, the one or more factors including a bank identification number (BIN) and a reason response code (RRC) associated with the authorization request; and iteratively re-processing the authorization request according to the re-submission schedule across a payment network in electronic communication with the payment processing computing system, the authorization request including at least a portion of the plurality of transaction data of the electronic transaction, wherein iteratively re-processing the authorization request comprises;

iteratively transmitting, by the payment processing computing system, the authorization request across the payment network to the issuer processor, each iterative transmission of the authorization request for an iterative reduced transaction value that is less than the initial transaction value and greater than a configurable threshold value unique to the merchant system in each iterative transmission of the re-processed authorization request until approval is received from the issuer processor by the payment processing computing system or until the iterative reduced transaction value of a re-processed authorization request falls below the configurable threshold value.

15. The system of claim 14, wherein the iterative reduced transaction value comprises a reduction by an incremental percentage of a predefined transaction value.

16. The system of claim 14, wherein the iterative reduced transaction value comprises a stepwise reduction by a unit value.

17. The system of claim 14, wherein the instructions executed by the at least one processor further cause the at least one processor to perform operations comprising:

determine the re-submission schedule based on a partial authorization of the electronic transaction and a timing of the electronic transaction.

18. The system of claim 14, wherein the instructions executed by the at least one processor further cause the at least one processor to perform operations comprising:

receiving an electronic transaction result from the issuer processor; and updating a dataset of historical processing results using the received electronic transaction result.

19. The system of claim 14, wherein the instructions executed by the at least one processor further cause the at least one processor to perform operations comprising:

transmitting, to the POS device, indication of an approved authorization when the issuer processor approves the authorization request.

20. The system of claim 14, wherein the electronic transaction is one of a series of recurring transactions of a predefined transaction amount.

* * * * *